(12) United States Patent
She

(10) Patent No.: US 12,263,718 B2
(45) Date of Patent: Apr. 1, 2025

(54) TRANSPORT REFRIGERATION SYSTEM WITH BATTERY TEMPERATURE CONTROL

(71) Applicant: Carrier Corporation, Palm Beach Gardens, FL (US)

(72) Inventor: Xu She, Cohoes, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 95 days.

(21) Appl. No.: 18/179,100

(22) Filed: Mar. 6, 2023

(65) Prior Publication Data
US 2023/0286354 A1    Sep. 14, 2023

Related U.S. Application Data

(60) Provisional application No. 63/318,460, filed on Mar. 10, 2022.

(51) Int. Cl.
*B60H 1/00* (2006.01)

(52) U.S. Cl.
CPC ..... *B60H 1/00792* (2013.01); *B60H 1/00428* (2013.01); *B60H 2001/00614* (2013.01)

(58) Field of Classification Search
CPC ............ B60H 1/00792; B60H 1/00428; B60H 1/3232; B60H 2001/00614; F25D 11/003
See application file for complete search history.

(56) References Cited

U.S. PATENT DOCUMENTS

| | | |
|---|---|---|
| 6,407,533 B1 | 6/2002 | Bartek et al. |
| 6,946,216 B2 | 9/2005 | Mu-Tsai et al. |
| 9,997,811 B2 | 6/2018 | Champagne et al. |
| 10,730,403 B2 | 8/2020 | Porras et al. |
| 10,759,284 B2 | 9/2020 | Jaensch et al. |

(Continued)

FOREIGN PATENT DOCUMENTS

| | | |
|---|---|---|
| CN | 104638318 B | 11/2016 |
| CN | 109599614 A | 4/2019 |

(Continued)

OTHER PUBLICATIONS

European Search Report for Application No. 23160588.2, Issued Aug. 10, 2023, 7 Pages.

(Continued)

*Primary Examiner* — Marc E Norman
(74) *Attorney, Agent, or Firm* — CANTOR COLBURN LLP

(57) ABSTRACT

A transport refrigeration system includes a compressor, condenser and evaporator configured to circulate a refrigerant; a motor configured to drive the compressor; a battery and power electronics configured to power the motor; an ambient air temperature sensor configured to monitor ambient air at the battery; a cooling unit configured to cool the power electronics; a controller, wherein the controller is configured to: receive an ambient air temperature of the compartment housing the battery; compare the ambient air temperature to a temperature threshold; and based at least in part on the comparing the ambient air temperature to the temperature threshold, performing at least one of (i) modify a cooling rate of the cooling unit and (ii) modify an operating parameter of the power electronics.

12 Claims, 3 Drawing Sheets

(56) References Cited

U.S. PATENT DOCUMENTS

| | | |
|---|---|---|
| 10,926,645 B2 | 2/2021 | Rilling et al. |
| 11,065,936 B2 | 7/2021 | Gonze et al. |
| 11,133,543 B2 | 9/2021 | Wu et al. |
| 11,137,173 B2 | 10/2021 | Poolman |
| 11,235,641 B2 | 2/2022 | Carlson et al. |
| 2012/0295141 A1 | 11/2012 | Allen |
| 2016/0118700 A1 | 4/2016 | Perumalla et al. |
| 2019/0214691 A1 | 7/2019 | Saroka et al. |
| 2019/0288350 A1 | 9/2019 | Saroka et al. |
| 2020/0009968 A1* | 1/2020 | Lewis ............... H01M 10/6568 |
| 2021/0215417 A1 | 7/2021 | Swab |
| 2021/0268864 A1 | 9/2021 | Saroka et al. |
| 2024/0034128 A1* | 2/2024 | Chapeau .............. B60H 1/3232 |

FOREIGN PATENT DOCUMENTS

| | | |
|---|---|---|
| CN | 11788709 A | 10/2020 |
| CN | 110137628 B | 11/2021 |
| DE | 10014848 C2 | 10/2001 |
| DE | 102017201686 A1 | 8/2018 |
| EP | 3812666 A1 | 4/2021 |
| FR | 2962070 A1 | 1/2012 |
| WO | 2020102061 A1 | 5/2020 |

OTHER PUBLICATIONS

European Search Report for Application No. 23160588.2, Issued Apr. 25, 2024, 6 Pages.

* cited by examiner

TRANSPORT REFRIGERATION SYSTEM WITH BATTERY TEMPERATURE CONTROL

CROSS-REFERENCE TO RELATED APPLICATIONS

This application claims the benefit of U.S. Provisional Application No. 63/318,460, filed Mar. 10, 2022, all of which are incorporated herein by reference in their entirety.

BACKGROUND

The present disclosure relates to transport refrigeration systems, and more specifically, to a transport refrigeration system having battery temperature control.

Existing transport refrigeration systems use batteries to power components of the transport refrigeration system. Batteries can suffer damage in extreme temperatures which can impact the performance and/or life of the battery during its lifetime. The extreme heat and/or cold temperatures effect the chemical reaction of the batteries that produces power. For example, in colder weather the battery may produce less current which can cause unreliable or insufficient power for a connected device.

BRIEF DESCRIPTION

According to an embodiment, a transport refrigeration system includes a compressor, condenser and evaporator configured to circulate a refrigerant; a motor configured to drive the compressor; a battery and power electronics configured to power the motor; an ambient air temperature sensor configured to monitor ambient air at the battery; a cooling unit configured to cool the power electronics; a controller, wherein the controller is configured to: receive an ambient air temperature of the compartment housing the battery; compare the ambient air temperature to a temperature threshold; and based at least in part on the comparing the ambient air temperature to the temperature threshold, performing at least one of (i) modify a cooling rate of the cooling unit and (ii) modify an operating parameter of the power electronics.

In addition to one or more of the features described herein, or as an alternative, further embodiments may include wherein modifying the cooling rate of the cooling unit includes reducing the cooling rate of the cooling unit.

In addition to one or more of the features described herein, or as an alternative, further embodiments may include wherein modifying the cooling rate of the cooling unit includes turning off the cooling unit.

In addition to one or more of the features described herein, or as an alternative, further embodiments may include wherein modifying the operating parameter of the power electronics includes increasing heat generated by the power electronics.

In addition to one or more of the features described herein, or as an alternative, further embodiments may include wherein increasing heat generated by the power electronics includes increasing a switching frequency of the power electronics.

In addition to one or more of the features described herein, or as an alternative, further embodiments may include wherein modifying the operating parameter of the power electronics includes terminating modifying the operating parameter of the power electronics when a temperature of the power electronics exceeds a limit.

According to another embodiment, a method for controlling temperature of a battery, the battery configured to provide power to a motor using power electronics, the method including receiving an ambient air temperature of a compartment housing the battery; comparing the ambient air temperature to a temperature threshold; and based at least in part on comparing the ambient air temperature to a temperature threshold, performing at least one of (i) modifying a cooling rate of a cooling unit and (ii) modifying an operating parameter of power electronics.

In addition to one or more of the features described herein, or as an alternative, further embodiments of the method may include wherein modifying the cooling rate of the cooling unit includes reducing the cooling rate of the cooling unit.

In addition to one or more of the features described herein, or as an alternative, further embodiments of the method may include wherein modifying the cooling rate of the cooling unit includes turning off the cooling unit.

In addition to one or more of the features described herein, or as an alternative, further embodiments of the method may include wherein modifying the operating parameter of the power electronics includes increasing heat generated by the power electronics.

In addition to one or more of the features described herein, or as an alternative, further embodiments of the method may include wherein increasing heat generated by the power electronics includes increasing a switching frequency of the power electronics.

In addition to one or more of the features described herein, or as an alternative, further embodiments of the method may include wherein modifying the operating parameter of the power electronics includes terminating modifying the operating parameter of the power electronics when a temperature of the power electronics exceeds a limit.

In addition to one or more of the features described herein, or as an alternative, further embodiments of the method may include wherein the motor is configured to drive a compressor of a transport refrigeration system.

Technical effects of embodiments of the present disclosure include using power electronics to control temperature of a battery in a transport refrigeration system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
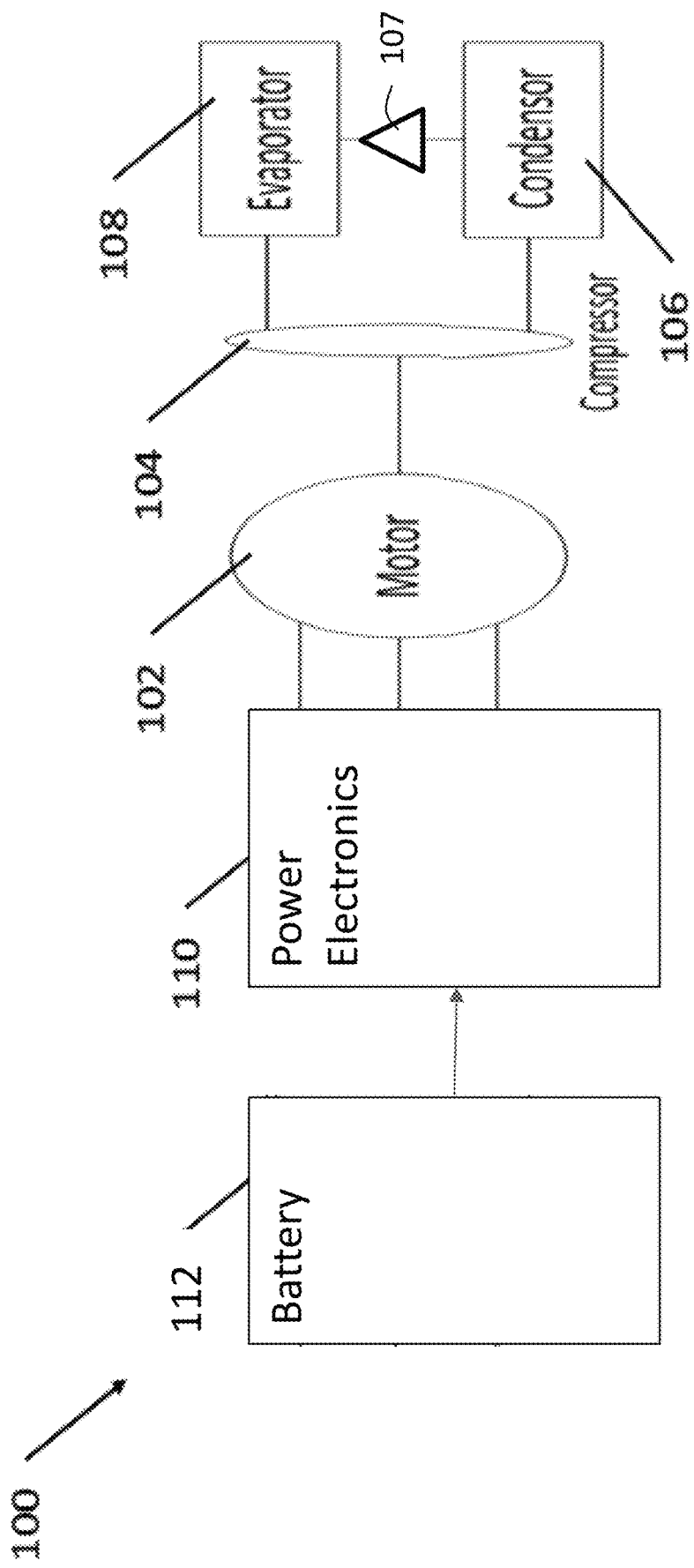
FIG. 1 is a block diagram of a transport refrigeration system in an example embodiment.

FIG. 1 is a block diagram of a transport refrigeration system 100 in an example embodiment. The transport refrigeration system 100 may be configured to condition air in a refrigerated container, a refrigerated trailer, refrigerated truck, etc. The transport refrigeration system 100 includes a variable speed motor 102 that is coupled to a compressor 104. The compressor 104 includes an impeller/rotor that rotates and compresses liquid refrigerant to a superheated refrigerant vapor for delivery to a condenser 106. In the condenser 106, the refrigerant vapor is liquefied at high pressure and rejects heat (e.g., to the outside air via a condenser fan in an air-cooled application). The liquid refrigerant exiting the condenser 106 is delivered to an evaporator 108 through an expansion valve 107. The refrigerant passes through the expansion valve 107 where a pressure drop causes the high-pressure liquid refrigerant to achieve a lower pressure combination of liquid and vapor. As fluid passes the evaporator 108, the low-pressure liquid refrigerant evaporates, absorbing heat from the fluid, thereby cooling the fluid and evaporating the refrigerant. The low-pressure refrigerant is again delivered to the compressor 104 where it is compressed to a high-pressure, high temperature gas, and delivered to the condenser 106 to start the refrigeration cycle again. It is to be appreciated that while a specific transport refrigeration system is shown in FIG. 1, the present teachings may be applicable to any transport refrigeration system (or any system relying on electrically-stored power, such as electrical vehicles).

As shown in FIG. 1, the compressor 104 driven by a variable speed motor 102 from power supplied from power electronics 110. The power electronics are connected to a battery 112. The battery 112 may be a comprise a single battery, several batteries and/or a battery pack having a plurality of cells. The power electronics 110 may include an inverter that converts the DC voltage from the battery 112 into a multiphase, AC output voltage, at a desired frequency and/or magnitude in order to drive the multiphase motor 102.

In electronic transport refrigeration unit (eTRU) applications, such as that in FIG. 1, the battery 112 is a primary source of power and must provide reliable and predictable service for operation. Battery performance is directly impacted by environmental temperature of the battery 112. For a typical Li-ion battery, a low ambient temperature would significantly reduce the capacity of the battery 112, and therefore, impact operation of the transport refrigeration system 100.

Figure 2:
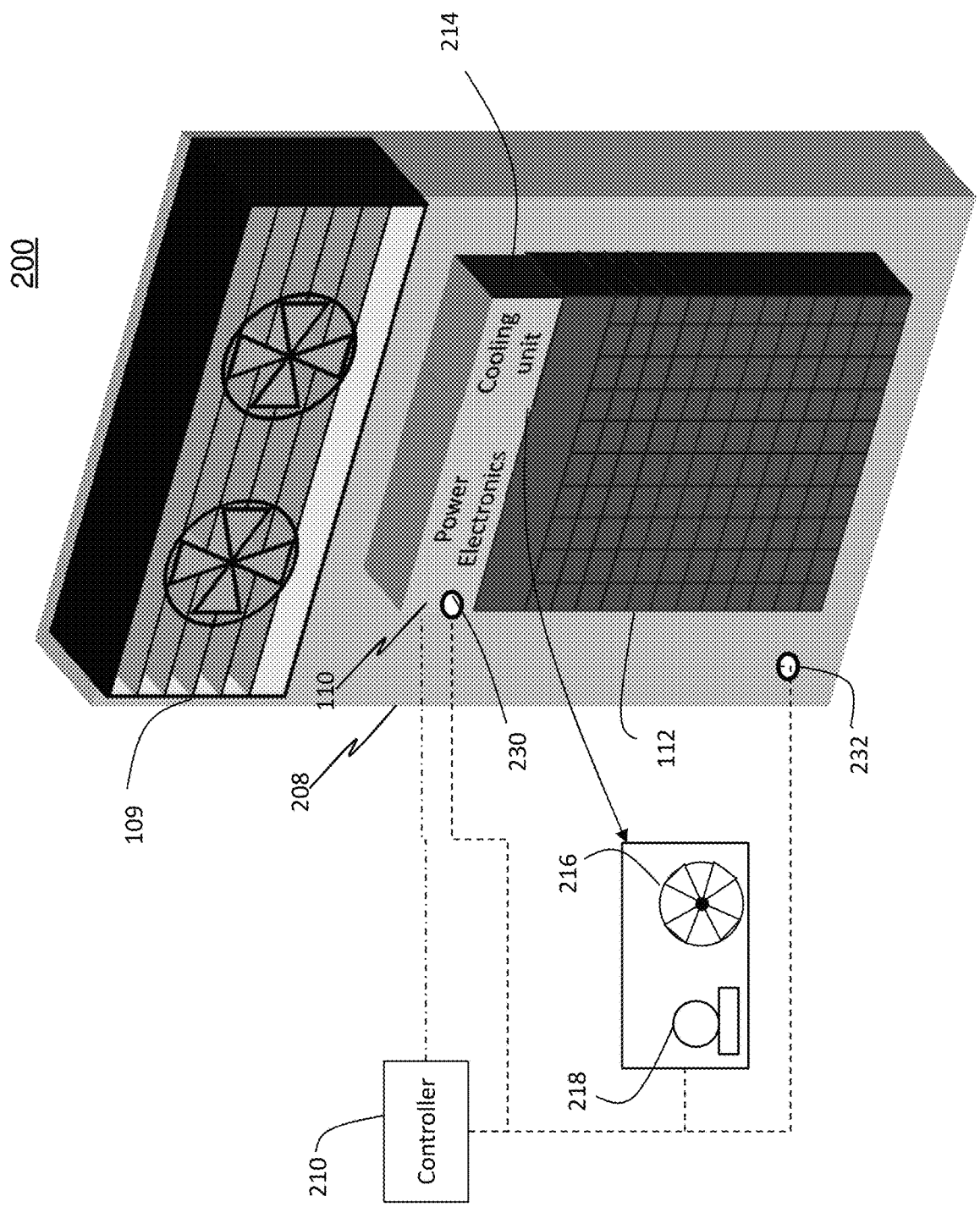
FIG. 2 depicts a system for battery temperature control with power electronics in an example embodiment.

FIG. 2 depicts a system 200 for controlling temperature of the battery 112 in an example embodiment. The system 200 may be implemented in various vehicles such as transport refrigeration trucks, trailers, containers, or other devices having a power electronics unit 110 and a battery 112 that may be housed in the same compartment or within proximity of one another. FIG. 2 depicts fans 109 which directed cooled air over the evaporator 108 to cool air in a refrigerated container, a refrigerated trailer, refrigerated truck, etc.

In a non-limiting example, the power electronics 110 and the battery 112 can be co-located in the same compartment 208. The heat generated by the power electronics 110 can be used to increase the temperature in the compartment 208 housing the battery 112. A cooling unit 214 provides cooling to the power electronics 110. The cooling unit 214 may use fan(s) 216 to air cool the power electronics 110 or pump(s) 218 to circulate a cooling fluid to a heat exchanger in the power electronics 110.

A controller 210 may be located in the power electronics unit 102 or may be located external to the power electronics unit 102. The controller 210 may configured to send control signals to the power electronics unit 102 to control the operation of one or more components within the power electronics unit 102. The controller 210 may be implemented using a general-purpose microprocessor executing a computer program stored on a storage medium to perform the operations described herein. Alternatively, the controller 210 may be implemented in hardware (e.g., ASIC, FPGA) or in a combination of hardware/software. The controller 210 may also be part of a control system of the transport refrigeration system 100.

The controller 210 communicates with one or more sensors. The controller 210 may be in communication with the sensors via a wired or wireless connection. A power electronics temperature sensor 230 monitors a temperature of the power electronics 110. An air temperature sensor 232 monitors temperature of ambient air in the compartment 208.

The cooling unit 214 may operate at different cooling rates, such as low, medium, and high, to help regulate temperature of the power electronics 110. The speed of the fans(s) 216 and/or pump(s) 218 is controlled to achieve the desired cooling rate. Other speed or flow rate settings can be used and is not intended to be limited by the examples discussed herein. The controller 210 can be configured to obtain the current cooling rate of the cooling unit 214 and the controller 210 can be further configured to modify operation of the cooling unit 214 to increase or decrease the cooling rate.

Figure 3:
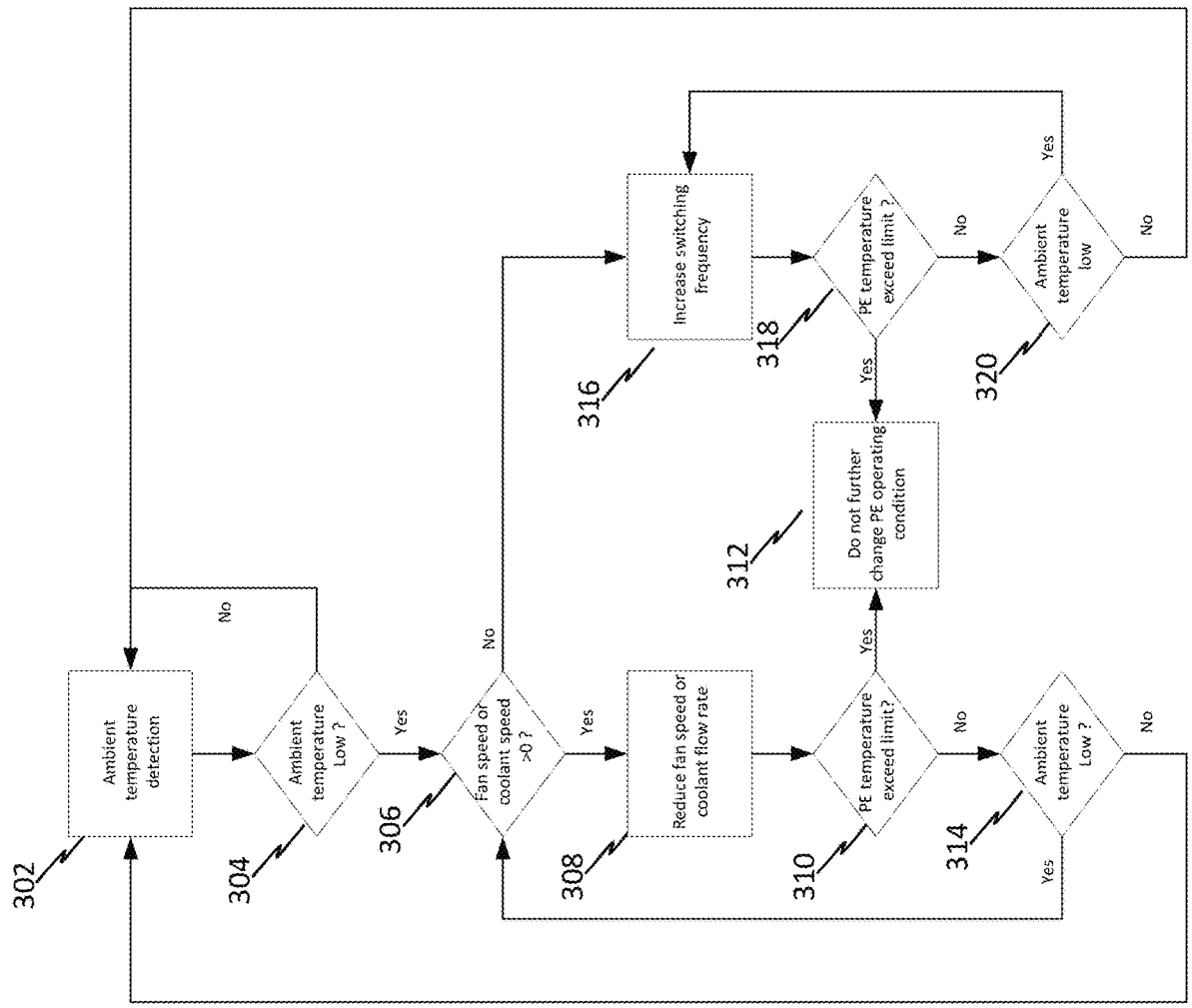
FIG. 3 is a flowchart of method for battery temperature control in an example embodiment.

FIG. 3 is a flowchart of method for battery temperature control in an example embodiment. The operations in FIG. 3 may be implemented by controller 210. The method begins at block 302 where the controller 210 detects, via air temperature sensor 232, the ambient temperature of the compartment 208. At decision block 304, the controller 210 determines if the ambient temperature is low by comparing the ambient temperature to a temperature threshold. If the ambient temperature is less than the temperature threshold, the ambient temperature is considered low. In a non-limiting example, the temperature threshold can be configured to −20, −10, 0 degrees. It can be appreciated that the temperature threshold can be set to any other value and is not limited to the examples discussed herein. If the controller 210 determines, based on comparing the current ambient temperature reading to the temperature threshold, the ambient temperature is not low, the controller 210 continues to monitor the ambient temperature of the ambient temperature at 302.

If at 304 the controller 210 determines the ambient temperature is low, one or more temperature control schemes can be implemented to increase the low ambient temperature. At block 306, the controller 210 detects if the cooling rate of the cooling unit 214 is greater than zero. This indicates that the fans(s) 216 and/or pump(s) 218 of the cooling unit 214 are operating.

If at 306 the controller 210 determines the cooling unit 214 is operating, the controller 210 can decrease the cooling rate of the cooling unit 214 at 308. At 308, the controller 210 commands the cooling unit 214 to reduce the cooling rate by reducing the fan 216 speed and/or pump 218 coolant flow rate to allow the heat to increase in the power electronics 110. In some non-limiting embodiments, the fan 216 speed and/or the pump 218 coolant flow rate can be completely powered off thus, ceasing cooling of the power electronics 110.

At 310, the controller 210 determines if a temperature of the power electronics 110, sensed by power electronics temperature sensor 230, exceeds a limit. If the temperature of the power electronics 110 exceeds the limit, the controller 210 determines at 312 that operating conditions of the power electronics 110 are not to be changed. In one or more embodiments, should the temperature of the power electronics 110 exceed a second limit greater than the limit, the cooling rate of the cooling unit 214 may be increased to avoid damage or shut down of the power electronics 110.

At block 314, the controller 210 checks the ambient temperature of compartment 208 via air temperature sensor 232. If the ambient temperature is low (e.g., below the temperature threshold), flows returns to block 306 to determine whether the cooling rate of the cooling unit 214 should be further reduced or stopped. Otherwise, the method 300 can return to block 302 to continue to monitor the ambient temperature of the battery.

Referring to block 306, if the cooling rate of the cooling unit 214 is not greater than zero (e.g., cooling unit 214 off), flow proceeds to block 316, where the controller 210 can increase a switching frequency of the power electronics unit 110 to increase the amount of heat generated by the power electronics 110. The power electronics include a plurality of switches (IGBTs and/or MOSFETs). The switches are turned on and off in response to a control signal (e.g., from controller 210) having a switching frequency. As the switching frequency increases, the amount of heat produced by the power electronics 110 increases and causes the temperature of the compartment 208 to increase.

At 318, the controller 210 determines if a temperature of the power electronics 110, sensed by power electronics temperature sensor 230, exceeds a limit. If the temperature of the power electronics 110 exceeds the limit, the controller 210 determines at 312 that operating conditions of the power electronics 110 are not to be changed. In one or more embodiments, should the temperature of the power electronics 110 exceed a second limit greater than the limit, the cooling rate of the cooling unit 214 may be increased to avoid damage or shut down of the power electronics 110.

At block 320, the controller 210 checks the ambient temperature via the air temperature sensor 232. If the ambient temperature is low (e.g., below the temperature threshold), flows returns to block 316 to again increase a switching frequency of the power electronics unit 110 to increase the amount of heat generated by the power electronics 110. Otherwise, the method returns to block 302 to continue to monitor the ambient temperature the compartment 208.

A detailed description of one or more embodiments of the disclosed apparatus and method are presented herein by way of exemplification and not limitation with reference to the Figures.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
    a compressor, condenser and evaporator configured to circulate a refrigerant;
    a motor configured to drive the compressor;
    a battery and power electronics configured to power the motor;
    an ambient air temperature sensor configured to monitor ambient air at the battery;
    a cooling unit configured to cool the power electronics;
    a controller, wherein the controller is configured to:
    receive an ambient air temperature at the battery;
    compare the ambient air temperature to a temperature threshold; and
    based at least in part on the comparing the ambient air temperature to the temperature threshold, modifying an operating parameter of the power electronics, wherein the modifying the operating parameter of the power electronics includes increasing heat generated by the power electronics.

2. The transport refrigeration system of claim 1, further comprising modifying a cooling rate of the cooling unit by reducing the cooling rate of the cooling unit.

3. The transport refrigeration system of claim 1, further comprising modifying a cooling rate of the cooling unit by turning off the cooling unit.

4. The transport refrigeration system of claim 1, wherein increasing heat generated by the power electronics includes increasing a switching frequency of the power electronics.

5. A transport refrigeration system comprising:
    a compressor, condenser and evaporator configured to circulate a refrigerant;
    a motor configured to drive the compressor;
    a battery and power electronics configured to power the motor;
    an ambient air temperature sensor configured to monitor ambient air at the battery;
    a cooling unit configured to cool the power electronics;
    a controller, wherein the controller is configured to:
    receive an ambient air temperature at the battery;
    compare the ambient air temperature to a temperature threshold; and
    based at least in part on the comparing the ambient air temperature to the temperature threshold, modifying an operating parameter of the power electronics, wherein modifying the operating parameter of the power electronics includes terminating the modifying the operating parameter of the power electronics when a temperature of the power electronics exceeds a limit.

6. A method for controlling temperature of a battery, the battery configured to provide power to a motor using power electronics, the method comprising:
    receiving an ambient air temperature at the battery;
    comparing the ambient air temperature to a temperature threshold; and
    based at least in part on comparing the ambient air temperature to a temperature threshold, modifying an operating parameter of power electronics, wherein the modifying the operating parameter of the power electronics includes increasing heat generated by the power electronics.

7. The method of claim 6, further comprising modifying a cooling rate of the cooling unit by reducing the cooling rate of the cooling unit.

8. The method of claim 6, further comprising modifying a cooling rate of the cooling unit by turning off the cooling unit.

9. The method of claim 6, wherein increasing heat generated by the power electronics includes increasing a switching frequency of the power electronics.

10. The method of claim 6, wherein the motor is configured to drive a compressor of a transport refrigeration system.

11. A method for controlling temperature of a battery, the battery configured to provide power to a motor using power electronics, the method comprising:
  receiving an ambient air temperature at the battery;
  comparing the ambient air temperature to a temperature threshold; and
  based at least in part on comparing the ambient air temperature to a temperature threshold, modifying an operating parameter of power electronics, wherein the modifying the operating parameter of the power electronics includes terminating the modifying the operating parameter of the power electronics when a temperature of the power electronics exceeds a limit.

12. A transport refrigeration system comprising:
  a compressor, condenser and evaporator configured to circulate a refrigerant;
  a motor configured to drive the compressor;
  a battery and power electronics configured to power the motor;
  an ambient air temperature sensor configured to monitor ambient air at the battery;
  a controller, wherein the controller is configured to:
  receive an ambient air temperature at the battery;
  compare the ambient air temperature to a temperature threshold; and
  based at least in part on the comparing the ambient air temperature to the temperature threshold, modifying an operating parameter of the power electronics, wherein the modifying the operating parameter of the power electronics includes increasing heat generated by the power electronics.

* * * * *